(12) United States Patent
Asahara et al.

(10) Patent No.: US 10,495,495 B2
(45) Date of Patent: Dec. 3, 2019

(54) LIQUID LEVEL DETECTION DEVICE OF LIQUID SUPPLYING FACILITY, LIQUID LEVEL DETECTION METHOD OF LIQUID SUPPLYING FACILITY, AND LIQUID SUPPLYING FACILITY HAVING THE LIQUID LEVEL DETECTION DEVICE

(71) Applicant: MITSUBISHI HEAVY INDUSTRIES, LTD., Tokyo (JP)

(72) Inventors: Taiki Asahara, Tokyo (JP); Hideyuki Sakata, Tokyo (JP); Takafumi Ogino, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/068,983

(22) PCT Filed: Sep. 21, 2016

(86) PCT No.: PCT/JP2016/077786
§ 371 (c)(1),
(2) Date: Jul. 10, 2018

(87) PCT Pub. No.: WO2017/130458
PCT Pub. Date: Aug. 3, 2017

(65) Prior Publication Data
US 2019/0025099 A1    Jan. 24, 2019

(30) Foreign Application Priority Data

Jan. 27, 2016    (JP) .................................. 2016-013142

(51) Int. Cl.
*G01F 1/34*    (2006.01)
*G01F 1/00*    (2006.01)
(Continued)

(52) U.S. Cl.
CPC ................ *G01F 1/34* (2013.01); *G01F 1/007* (2013.01); *G01F 23/18* (2013.01)

(58) Field of Classification Search
CPC combination set(s) only.
See application file for complete search history.

(56) References Cited

U.S. PATENT DOCUMENTS 2,843,144 A * 7/1958 Robinson .............. G01F 23/161
                                                                137/154
5,566,571 A * 10/1996 Kasai ...................... G01F 23/14
                                                                376/258

(Continued)

FOREIGN PATENT DOCUMENTS

DE     19511371 A1    10/1995
GB     2286048 A       8/1995
(Continued)

OTHER PUBLICATIONS

International Search Report dated Oct. 25, 2016, issued in counterpart International Application No. PCT/JP2016/077786. (11 pages).
(Continued)

*Primary Examiner* — Jewel V Dowtin
(74) *Attorney, Agent, or Firm* — Westerman, Hattori, Daniels & Adrian, LLP

(57) ABSTRACT

A liquid level detection device for a liquid supplying facility includes: a lower pipe which is in communication with a liquid-phase section of an interior space of a tank, the liquid-phase section being occupied by a liquid; an upper pipe which is in communication with a gas-phase section of the interior space of the tank, the gas-phase section being disposed above the liquid-phase section and occupied by a high-pressure gas; a differential pressure gauge for detecting a differential pressure between the lower pipe and the upper pipe; and a liquid level calculation part for calculating a liquid level of the tank on the basis of a differential pressure (Continued)

detection result of the differential pressure gauge. An inside of the upper pipe is filled with a filling liquid at least in a partial range.

7 Claims, 5 Drawing Sheets

(51) Int. Cl.
*G01F 23/18* (2006.01)
*G01F 23/00* (2006.01)
*G01F 23/14* (2006.01)

(56) References Cited

U.S. PATENT DOCUMENTS

| | | | | |
|---|---|---|---|---|
| 7,004,185 | B2* | 2/2006 | Mueller | B64F 1/28 137/1 |
| 2007/0251317 | A1* | 11/2007 | Lopushansky | G01F 23/14 73/299 |
| 2010/0161252 | A1 | 6/2010 | Seely et al. | |
| 2010/0241371 | A1 | 9/2010 | Ammouri et al. | |
| 2014/0196537 | A1* | 7/2014 | Park | G01F 23/16 73/299 |

FOREIGN PATENT DOCUMENTS

| | | |
|---|---|---|
| JP | 49-44442 B1 | 11/1974 |
| JP | 60-65401 U | 5/1985 |
| JP | 1-113619 A | 5/1989 |
| JP | 4-134027 U | 12/1992 |
| JP | H07-270576 A | 10/1995 |
| JP | 2000-155041 A | 6/2000 |
| JP | 2001-355802 A | 12/2001 |
| JP | 2008-267931 A | 11/2008 |

OTHER PUBLICATIONS

Notification of Transmittal of Copies of Translation of the International Preliminary Report on Patentability (Form PCT/IB/338) issued in counterpart International Application No. PCT/JP2016/ 077786 dated Aug. 9, 2018, with Forms PCT/IB/373, PCT/IB/326 and PCT/ISA/237, with English translation. (17 pages).
Extended (supplementary) European Search Report dated Jan. 7, 2019, issued in counterpart EP Application No. 16888044.1. (8 pages).
Office Action dated Jul. 2, 2019, issued in counterpart JP application No. 2016-013142, with English translation. (10 pages).

\* cited by examiner

LIQUID LEVEL DETECTION DEVICE OF LIQUID SUPPLYING FACILITY, LIQUID LEVEL DETECTION METHOD OF LIQUID SUPPLYING FACILITY, AND LIQUID SUPPLYING FACILITY HAVING THE LIQUID LEVEL DETECTION DEVICE

TECHNICAL FIELD

The present disclosure relates to a liquid level detection device and a liquid detection method of a liquid supplying facility for supplying a liquid stored in a container to outside, for detecting the liquid level of the liquid in the container, as well as a liquid supplying facility having the liquid level detection device.

BACKGROUND ART

In a plant facility or the like, a liquid supplying facility may be provided, which rapidly supplies a liquid stored in a container in a large flow rate. For instance, as an example of such a liquid supplying facility, a liquid supplying facility for supplying a large amount of cooling liquid rapidly to a high-temperature portion may be provided for a power plant or the like. At this time, by detecting a liquid level change of the liquid stored in the container and calculating the flow rate of the supplied liquid from the liquid level change, it is possible to determine the supply state of the liquid (e.g. the supply state of the cooling liquid to the high-temperature portion inside the power plant).

As a typical technique for detecting the liquid level of a liquid stored in a liquid container, for instance, there is a technique of obtaining a differential pressure between a pressure of a pipe in communication with a gas-phase section inside the liquid container and a pressure of a pipe in communication with a liquid-phase section inside the liquid container, and calculating a liquid level on the basis of the differential pressure. As an example of the liquid level detection device for calculating a liquid level on the basis of the differential pressure, Patent Document 1 discloses the following liquid level detection device.

The liquid level detection device disclosed in Patent Document 1 is configured to prevent liquid level measurement errors due to a temperature difference formed inside a pipe, in a pipe configuration for measuring the liquid level inside a liquid tank. The liquid level detection device disclosed in Patent Document 1 detects the differential pressure between an upper liquid level detection pipe and a lower liquid level detection pipe each connected at an end to the gas-phase side and the liquid-phase side of a balance pipe to which the liquid level inside the liquid tank is introduced. The differential pressure is obtained from a difference between two pressure values measured by two diaphragm portions for pressure measurement disposed on each of the second ends of the upper liquid level detection pipe and the lower liquid level detection pipe.

Furthermore, in the liquid level detection device disclosed in Patent Document 1, water is stored in the second ends of the upper liquid level detection pipe and the lower liquid level detection pipe, to prevent high-temperature steam formed by evaporation of the liquid in the liquid tank into a gas phase from increasing the temperature of the diaphragm portion for pressure measurement disposed in the upper liquid level detection pipe which is in communication with the gas-phase side of the balance pipe. As a result, with the liquid level detection device disclosed in Patent Document 1, it is possible to prevent liquid level measurement errors due to a meat temperature difference between the measurement diaphragm portion at the side of the upper liquid level detection pipe and the measurement diaphragm portion at the side of the lower liquid level detection pipe.

CITATION LIST

Patent Literature

Patent Document 1: JP2008-267931A

SUMMARY

Problems to be Solved

Meanwhile, in, a liquid supplying facility for supplying a liquid stored in a liquid tank to outside, the following problem arises when detecting the liquid level of the liquid tank on the basis of a differential pressure in the pipe in communication with the liquid tank as described above.

When the liquid is rapidly discharged outside the liquid tank, a rapid decrease in the liquid surface level leads to rapid expansion of the gas-phase section above the liquid surface, which causes a great temperature decrease of the gas occupying the gas-phase section, and a great density change of the gas corresponding to the temperature decrease. Meanwhile, it takes some time for the pressure decrease in the liquid tank to propagate to the gas inside the pipe which is in communication with the gas-phase side of the liquid tank, and a rapid temperature decrease is less likely to happen due to the influence of heat exchange with ambient air if the pipe is exposed to ambient air. As a result, a great temperature difference is generated between the gas in the pipe in communication with the gas-phase side of the liquid tank for liquid level measurement and the gas in the tank, which causes liquid level detection errors.

In this regard, Patent Document 1 does not disclose a specific solution to the above problem of the liquid supplying facility.

In view of the above problem, an object of at least one embodiment of the present invention is to provide a liquid level detection method and a liquid level detection device capable of accurately detecting a liquid level in a liquid tank at the time of discharge of the liquid from the liquid tank. Further, an object of at least one embodiment of the present invention is to obtain a liquid supplying apparatus including the liquid level detection method and the liquid level detection device.

Solution to the Problems (1) A liquid level detection device of a liquid supplying facility according to some embodiment of the present invention is a liquid level detection device of a liquid supplying facility which includes: a tank in which a liquid is stored and a high-pressure gas is enclosed; a discharge pipe for discharging the liquid in the tank to outside with the high-pressure gas; and a valve, disposed in the discharge pipe, for switching a communication state between the tank and the outside. The liquid level detection device includes: a lower pipe which is in communication with a liquid-phase section of an interior space of the tank, the liquid-phase section being occupied by the liquid; an upper pipe which is in communication with a gas-phase section of the interior space of the tank, the gas-phase section being disposed above the liquid-phase section and occupied by the high-pressure gas; a differential pressure gauge for detecting a differential pressure between the lower pipe and the upper pipe; and a liquid level calculation part for calculating a liquid level of the tank on the basis of a differential pressure detection result of the differential pressure gauge. An inside of the upper pipe is filled with a filling liquid at least in a partial range.

In the above configuration (1), the inside of the upper pipe in communication with the gas-phase section in the tank is filled with the filling liquid in at least a partial range, and the density change of the filling liquid in response to a temperature change is sufficiently small as compared to that of the high-pressure gas. Thus, in the above configuration (1), with the filling liquid filling at least a part of the pipe and the head pressure of the filling liquid occupying at least a part of the head pressure in the pipe, it is possible to reduce liquid level detection errors due to the temperature difference of the high-pressure gas between inside the tank and inside the upper pipe.

(2) In an illustrative embodiment of the present invention, in the above configuration (1), the liquid level detection device further includes a flow rate calculation part for obtaining a flow rate of the liquid flowing through the discharge pipe of the liquid level detection facility, on the basis of a temporal change of the liquid level of the tank detected by the liquid level calculation part.

As described above, with the above configuration (1), it is possible to reduce liquid level detection errors due to the temperature difference of the high-pressure gas between inside the tank and inside the upper pipe at the time of discharge of the liquid from the liquid tank. Thus, with the above configuration (2), it is possible to accurately calculate the flow rate of the liquid flowing from the tank, at the time of discharge of the liquid from the tank.

(3) In an illustrative embodiment of the present invention, in the above configuration (1) or (2), an end of the upper pipe is in communication with a gas-phase section of the tank via a pipe header, and a liquid level of the filling liquid filling an inside of the upper pipe is within minus 50 cm from a height at which the pipe header is positioned.

With the above configuration (3), the liquid level of the filling liquid filling the inside of the pipe is set within minus 50 cm from the height of the pipe header via which the upper pipe is in communication with the gas-phase section of the tank. As a result, most part of the upper pipe is filled with the filling liquid, and the head pressure of the filling liquid occupies most part of the head pressure of the pipe. Thus, it is possible to reduce liquid level detection errors due to the temperature difference of the high-pressure gas between inside the tank and inside the upper pipe, effectively.

(4) In an illustrative embodiment of the present invention, in the above configurations (1) to (3), the liquid level detection device further includes a temperature sensor for detecting a temperature of the high-pressure gas in the tank. The liquid level calculation part is configured to calculate the liquid level of the tank on the basis of a temperature detection result in addition to the differential pressure detection result.

When the liquid is rapidly discharged outside the tank, a rapid decrease in the liquid surface level leads to rapid expansion of the gas-phase section above the liquid surface, which causes a great temperature decrease of the high-pressure gas occupying the gas-phase section inside the tank, and a great density change of the high-pressure gas corresponding to the temperature decrease. Meanwhile, the head pressure of the high-pressure gas occupying the gas-phase section inside the tank changes in response to the density change of the high-pressure gas and affects the pressure measurement value at the side of the lower pipe, and thus the differential pressure detection result between the lower pipe and the upper pipe also changes affected by the density change of the high-pressure gas.

Thus, as in the above configuration (4), by detecting the temperature of the high-pressure gas in the tank with the temperature sensor and using the temperature detection result for calculation of the liquid level inside the tank, it is possible to detect the liquid level inside the tank with a higher accuracy.

(5) In an illustrative embodiment of the present invention, in the configuration (1) to (4), the high-pressure gas contains nitrogen gas.

Nitrogen gas condensates only at an extremely low temperature near minus 200° C. under normal pressures, unlike water vapor or the like. Furthermore, at normal temperatures, nitrogen does not condensate even when being expressed at a high pressure of a few MPa. Thus, with the above embodiment (5), it is possible to reduce the risk of condensation of the high-pressure gas containing nitrogen when the liquid is discharged from the tank, and to suppress reduction of the liquid level detection accuracy due to condensation of the high-pressure gas. Further, nitrogen gas is an inexpensive gas that can be obtained easily and in a large amount. Thus, according to this configuration (5), with the high-pressure gas including nitrogen gas that can be obtained easily and in a large amount, it is possible to suppress deterioration of the liquid level detection accuracy due to condensation of high-pressure gas.

(6) A liquid supplying facility according to some embodiments of the present invention includes: a tank in which a liquid is stored and a high-pressure gas is enclosed; a discharge pipe for discharging the liquid in the tank to outside with the high-pressure gas; and a valve, disposed in the discharge pipe, for switching a communication state between the tank and the outside, and the liquid level detection device according to any one of the above (1) to (5), configured to detect a liquid level of the tank.

As described above, with the above configuration (1) to (5), it is possible to reduce liquid level detection errors due to the temperature difference of the high-pressure gas between inside the tank and inside the upper pipe at the time of discharge of the liquid from the liquid tank. Thus, with the above configuration (6), it is possible to provide a liquid supplying facility capable of supplying a liquid from a discharge valve while detecting the liquid level change accurately, at the time of discharge of the liquid from the liquid tank.

(7) A liquid level detection method of a liquid supplying facility is for a liquid supplying facility which includes: a tank in which a liquid is stored and a high-pressure gas is enclosed; a discharge pipe for discharging the liquid in the tank to outside with the high-pressure gas; and a valve, disposed in the discharge pipe, for switching a communication state between the tank and the outside. The liquid level detection method includes: a step of detecting a differential pressure between: a lower pipe which is in communication with a liquid-phase section of an interior space of the tank, the liquid-phase section being occupied by the liquid; and an upper pipe which, is in communication with a gas-phase section of the interior space of the tank the gas-phase section being disposed above the liquid-phase section and occupied by the high-pressure gas; and a step of calculating a liquid level of the tank on the basis of a detection result of the differential pressure. An inside of the upper pipe is filled with a filling liquid at least in a partial range.

In the above method (7), the inside of the upper pipe in communication with the gas-phase section in the tank is filled with the filling liquid in at least a partial range, and the density change of the filling liquid in response to a temperature change is sufficiently small as compared to that of the high-pressure gas. Thus, in the above method (7), with the filling liquid filling at least a part of the upper pipe and the head pressure of the filling liquid occupying at least a part of the head pressure in the upper pipe, it is possible to reduce liquid level detection errors due to the temperature difference of the high-pressure gas between inside the tank and inside the upper pipe.

Advantageous Effects

As described above, with the liquid level detection device according to at least one embodiment of the present invention, it is possible to detect the liquid level inside the liquid tank accurately at the time of discharge of the liquid from the liquid tank.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of an equal state such as "same" "equal" and "uniform" shall not be construed as indicating only the state in which the feature is strictly equal, but also includes a state in which there is a tolerance or a difference that can still achieve the same function. On the other hand, an expression such as "comprise", "include", "have", "contain" and "constitute" are not intended to be exclusive of other components.

First, with reference to FIG. 1, the configuration of the liquid supplying apparatus and the liquid level detection device according to some embodiments will be described, Next, to describe the advantageous technique of the liquid supplying apparatus and the liquid level detection device according to some embodiments of the present invention, the configuration of the liquid supplying apparatus and the liquid level detection device shown in FIGS. 1A and 1B will be compared with the configuration of the liquid supplying apparatus and the liquid level detection device shown in FIGS. 2A and 2B as a comparative example. Finally, in view of results of the above comparison, a solution to a typical problem with the liquid supplying apparatus and the liquid level detection device according to some embodiments of the present invention will be described with reference to FIGS. 3A to FIG. 5.

Figure 1A:
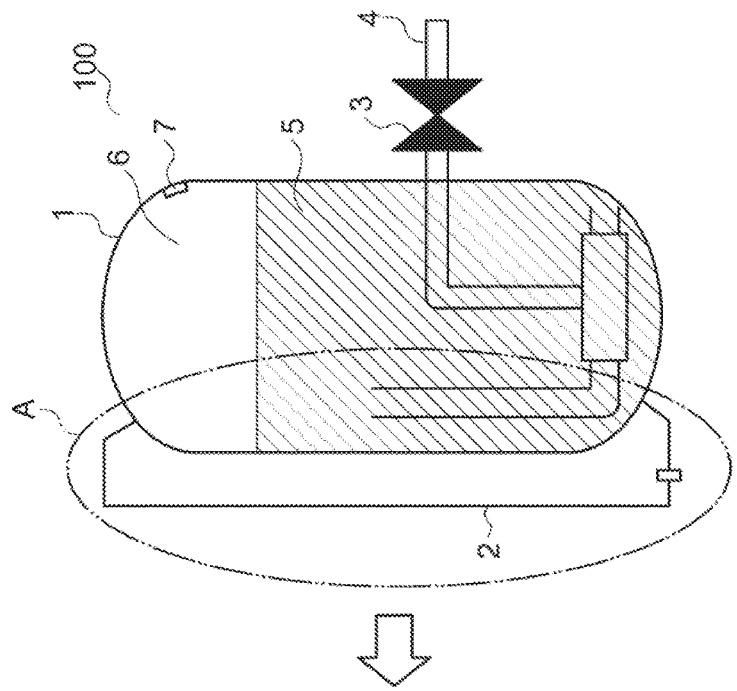
FIGS. 1A and 1B are each a configuration diagram of a liquid supplying apparatus and a liquid level detection device according to an embodiment of the present invention.

FIG. 1A is a diagram showing the overall configuration of a liquid supplying apparatus 100 according to an embodiment of the present invention.

In some embodiments, as shown in FIG. 1A, the liquid supplying apparatus 100 includes a tank 1 storing liquid 5 and enclosing high-pressure gas 6, a discharge pipe 4 for discharging the liquid 5 in the tank 1 to outside with the high-pressure gas 6, and a valve 3 disposed in the discharge pipe 4 for switching the communication state between the tank 1 and outside. The liquid supplying apparatus is configured to supply, when the valve 3 opens, the liquid 5 to outside from the discharge pipe 4 by forcing the liquid 5 in the tank 1 with the pressure of the high-pressure gas 6 sealed above the liquid surface of the liquid 5 in the tank 1 in a pressure accumulated state.

In some embodiments, the discharge pipe 4 is connected to a liquid supplying system of a type of plant. The pressure of the liquid supplying system of the plant may vary depending on the operation state of the plant. In this case, while the valve 3 prevents a flow of liquid flowing from the plant toward the tank 1, the valve 3 may be a check valve configured to permit a flow from the tank 1 toward the plant. In this way, the check valve 3 closes when the pressure of the liquid supplying system of the plant is higher than the pressure of the high-pressure gas 6 in the tank 1, and opens when the pressure of the liquid supplying system of the plant is lower than the pressure of the high-pressure gas 6 in the tank 1 so that liquid is supplied from the tank 1 toward the plant via the discharge pipe 4.

For instance, in an illustrative embodiment, in a nuclear power plant, a liquid supplying apparatus 100 for supplying a large amount of cooling liquid to a reactor core may be provided. In this case, according to this embodiment, the valve 3 may be a check valve so that the valve 3 opens in case the pressure of the reactor core drops due to an accident, in response to a difference between the reduced core pressure and the high pressure in the tank 1.

Furthermore, the charged pressure of the high-pressure gas in the tank 1 is not less than 3 Mpa and not more than 5 Mpa. Further, the high-pressure gas 6 may contain nitrogen gas. Nitrogen gas condensates only at an extremely low temperature near minus 200° C. under normal pressures, unlike water vapor or the like. Furthermore, at normal temperatures, nitrogen does not condensate even when being expressed at a high pressure of a few MPa. Thus, according to this embodiment, it is possible to reduce the risk of condensation of the high-pressure gas 6 containing nitrogen when the liquid 5 is discharged from the tank 1, and to suppress deterioration of the liquid level detection accuracy due to condensation of the high-pressure gas 6. Further, nitrogen gas is an inexpensive gas that can be obtained easily and in a large amount. Thus, according to this embodiment, with the high-pressure gas 6 being nitrogen gas that can be obtained easily and in a large amount, it is possible to suppress deterioration of the liquid level detection accuracy due to condensation of high-pressure gas.

Further, the tank 1 includes a differential pressure pipe 2 for detecting a differential pressure between a gas-phase upper section and a liquid-phase lower section inside the tank 1. The specific configuration of the differential pressure pipe 2 will be described below. Further, FIG. 1B is an enlarged view of the differential pressure pipe 2 provided for the tank 1 and an oval region A surrounding the differential pressure pipe 2, also showing the configuration of the liquid level detection apparatus 100 according to an embodiment of the present invention. With reference to FIG. 1B, the differential pressure pipe 2 includes a lower pipe 2c which is in communication with a liquid-phase section occupied by the liquid 5 inside the tank 1, an upper pipe 2a which is in communication with a gas-phase section occupied by the high-pressure gas 6, positioned above the liquid-phase section inside the tank 1, and a differential pressure gauge 2b for detecting the differential pressure between the lower pipe 2c and the upper pipe 2a. An end of the upper pipe 2a opposite to the differential pressure gauge 2b is connected to a pipe header 8 disposed on an upper outer wall of the tank 1, and is in communication with the gas-phase section inside the tank 1. The inside of the upper pipe 2a is filled with a filling liquid 9 at least in a partial range.

In the case of the liquid level detection device 110 having the above configuration, the differential pressure gauge 2b is configured to output a differential pressure $\Delta P$ between the pressure P1 of the upper pipe 2a and the pressure P2 of the lower pipe 2c.

Furthermore, the liquid level detection device 110 having the above configuration includes a liquid level calculation part 10 for calculating the liquid level of the liquid 5 inside the tank 1, on the basis of a differential pressure detection result of the differential pressure gauge 2b. The liquid level calculation part 10 calculates the liquid level of the tank 1 on the basis of the detection result of the differential pressure $\Delta P$ received from the differential pressure gauge 2b, and outputs the liquid level to a flow rate calculation part 11. In an illustrative embodiment, the liquid level calculation part 10 is electrically connected to the differential pressure gauge 2b, and signals indicating; detection data and calculation results are transmitted between the differential pressure gauge 2b and the liquid level calculation part 10. A specific example of a calculation method by which the liquid level calculation part 10 calculates the liquid level of the tank 1 on the basis of the detection result of the differential pressure $\Delta P$ received from the differential pressure gauge 2b will be described below in detail with reference to FIGS. 4 and 5.

Furthermore, in an embodiment, the liquid level detection device 110 having the above configuration further includes a flow rate calculation part 11 for obtaining the flow rate of the liquid 5 flowing through the discharge pipe 4 of the liquid supplying apparatus 100, on the basis of a temporal change of the liquid level of the tank 1 detected by the liquid level calculation part 10. In an illustrative embodiment, the flow rate calculation part 11 is electrically connected to the liquid level calculation part 10, and signals indicating calculation results are transmitted between the liquid level calculation part 10 and the flow rate calculation part 11.

Further, the liquid supplying apparatus 100 further includes a temperature sensor 7 for detecting the temperature of the high-pressure gas 6 in the tank 1. For instance, the temperature sensor 7 may be provided so as to be exposed to the gas-phase section in the tank 1, and may be configured to measure the temperature of the high-pressure gas 6 occupying the gas-phase section by using thermocouple and output a temperature measurement value to the liquid level detection device 110.

In an illustrative embodiment, the liquid level calculation part 10 may be configured to calculate the liquid level of the tank 1 on the basis of a temperature detection result by the temperature sensor 7, in addition to a detection result of the differential pressure $\Delta P$. This is because, while the head pressure of the high-pressure gas 6 acting from above on the liquid surface of the liquid 5 in the tank 1 serves as information that can be used to calculate the liquid level in the tank 1, the head pressure varies when the gas density of the high-pressure gas 6 changes with a temperature change of the high-pressure gas 6. In this case, the liquid level calculation part 10 may calculate a temperature decrease amount of the high-pressure gas 6 due to expansion of the gas-phase section at the time of discharge of the liquid 5 on the basis of the temperature detection value from the temperature sensor 7. Next, the liquid level calculation part 10 may correct the differential pressure detection result outputted by the differential pressure gauge 2b on the basis of a density increase of the high-pressure gas 6 corresponding to the temperature decrease, and calculate the liquid level of the tank 1 on the basis of the corrected differential pressure detection result.

With the liquid supplying apparatus 100 having the above configuration, it is possible to monitor time-series transition of the flow rate of the liquid 5 supplied from the discharge pipe 4 of the liquid supplying apparatus 100, from the flow rate calculation result outputted by the flow rate calculation part 11. Accordingly, it is possible to understand the supply state of the liquid to a high-pressure portion of the plant facility from the liquid supplying apparatus 100. For instance, if the power plant is a nuclear power plant, the liquid supplying apparatus 100 may be provided to supply a large amount of cooling liquid rapidly to a reactor core. At this time, in this embodiment, the valve 3 being a check valve 3 may be configured to open in response to a differential pressure between a reduced reactor core pressure and a high pressure in the tank 1 of the liquid supplying apparatus 100 in case the pressure in the reactor core decreases upon occurrence of an accident.

Next, with reference to FIGS. 2 to 5, the technical advantage of the liquid supplying apparatus and the liquid level detection device according to some embodiments of the present invention will be described in detail.

Figure 1B:
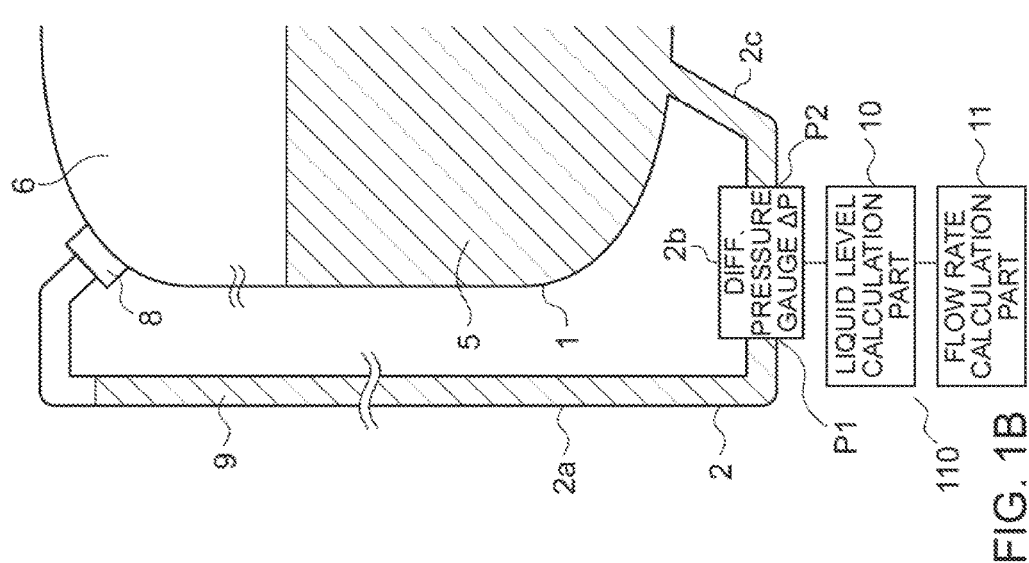
Figure 2A:
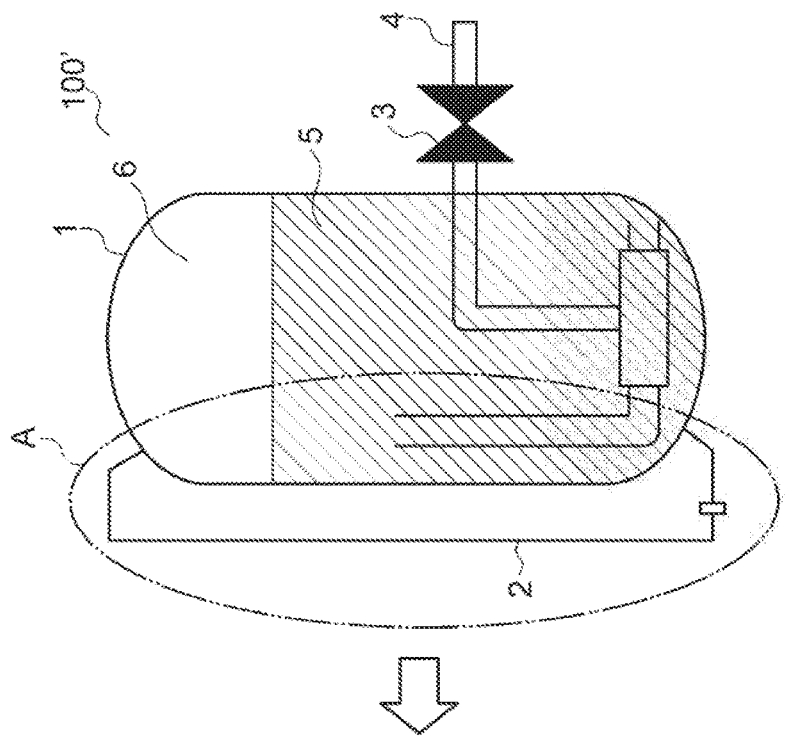
FIGS. 2A and 2B are each a configuration diagram of a liquid supplying apparatus and a liquid level detection device according to a typical comparative example.
Figure 2B:
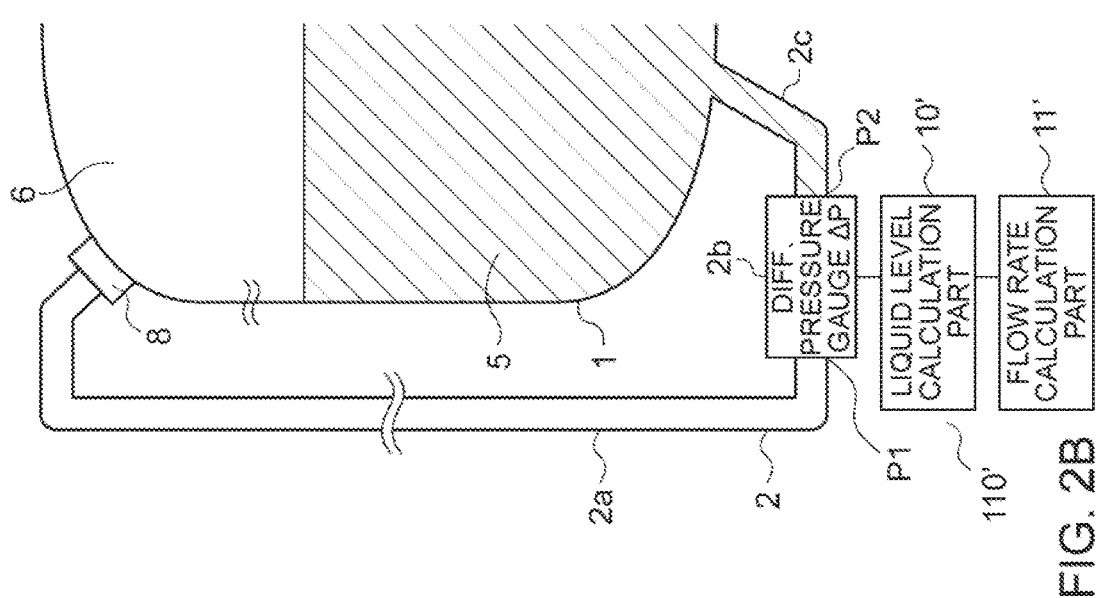

FIGS. 2A and 2B are configuration diagrams of a liquid level detection device 110' according to a comparative example. Similarly to FIGS. 1A and 1B, FIG. 2A shows the differential pressure pipe 2 provided for the tank 1 and an oval region A surrounding the vicinity of the differential pressure pipe 2, and FIG. 2B shows an enlarged view of the inside of the oval region A.

Figure 3B:
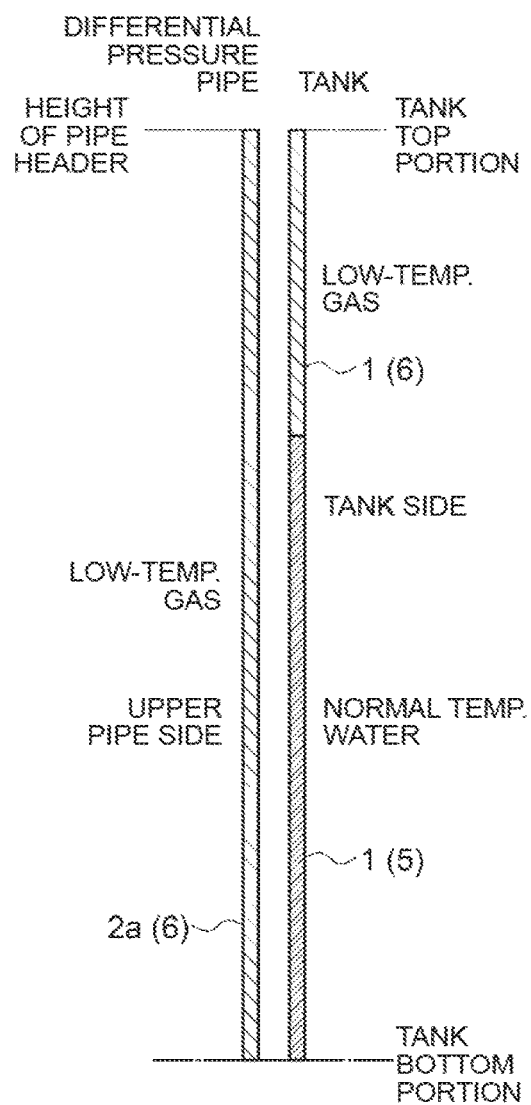
FIGS. 3A and 3B are diagrams showing constituent components of pressure in a differential pressure pipe and a tank.
Figure 3A:
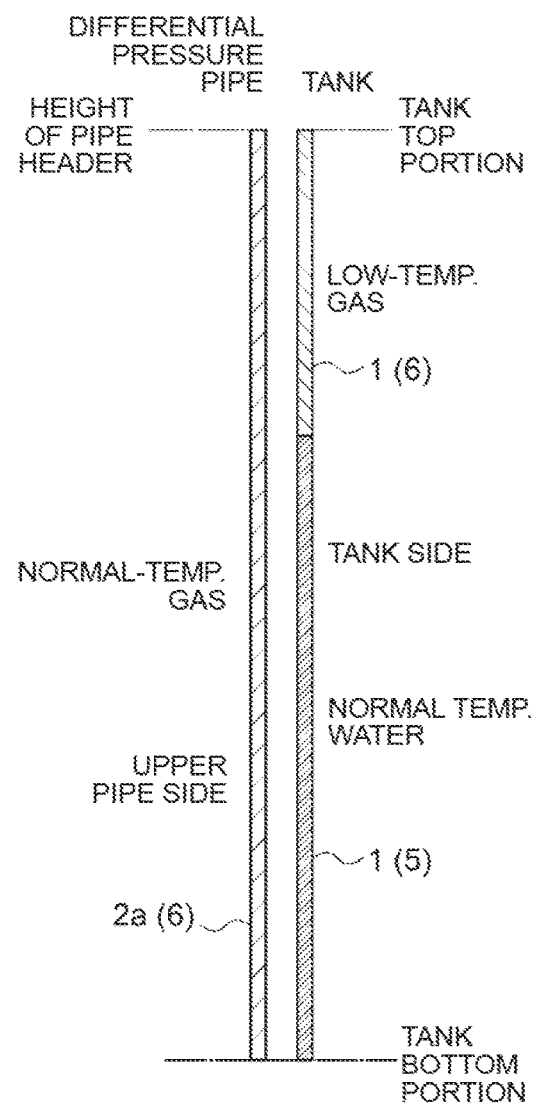
Figure 4:
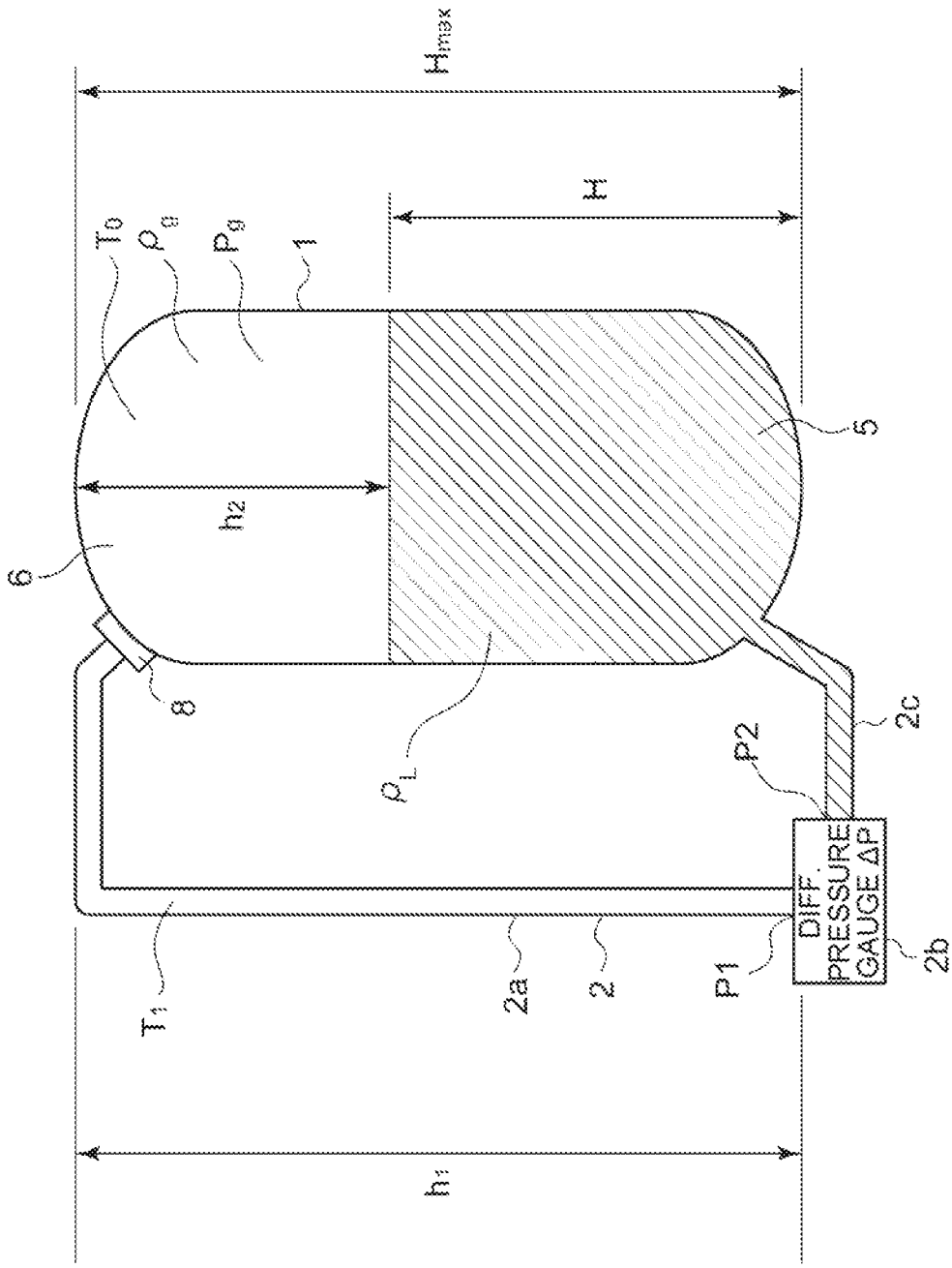
FIG. 4 is a diagram showing various parameters used to calculate a liquid level in a tank from a differential pressure detection result from a differential pressure pipe.
Figure 5:
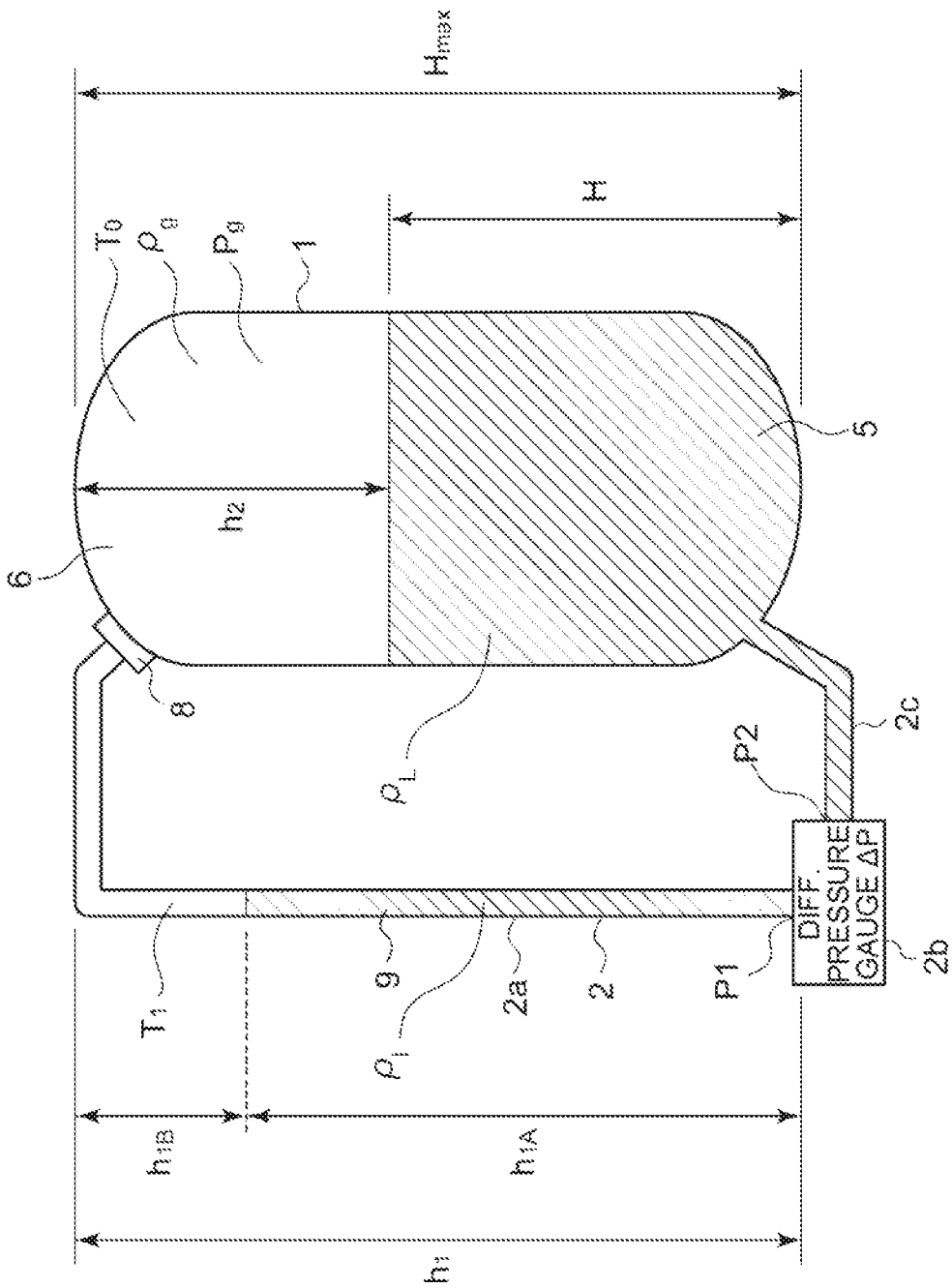
FIG. 5 is a diagram showing, various parameters used to calculate a liquid level in a tank from a differential pressure detection result from a differential pressure pipe.

FIGS. 3A and 3B are diagrams for describing the principle of liquid level measurement by the liquid level detection device 110' according to a comparative example. FIG. 4 is a diagram showing the definition of various parameters of the liquid supplying apparatus 100' according to a comparative example. FIG. 5 is a diagram showing the definition of various parameters of the liquid supplying apparatus 100 according to a working example.

Unlike the configuration of the liquid supplying apparatus 100 and the liquid level detection device 110 shown in FIG. 1, the upper pipe 2a constituting the differential pressure pipe 2 in FIG. 2B is not filled with the filling liquid 9. That is, in FIG. 2B, the upper pipe 2a is entirely filled with the same gas as the high-pressure gas 6 in the tank 1, unlike FIG. 1B.

Besides the above difference, the liquid supplying apparatus 100 and the liquid level detection device 110 shown in FIGS. 1A and 1B have the same configuration as the liquid supplying apparatus 100' and the liquid level detection device 110' shown in FIGS. 2A and 2B as a comparative example. Thus, besides the above configuration, the configuration of the liquid supplying apparatus 100' and the liquid level detection device 110' shown in FIGS. 2A and 2B will not be described again in detail.

In the liquid supplying apparatus 100' and the liquid level detection device 110' shown in FIG. 2, when the liquid surface of the liquid 5 descends at the time of discharge of the liquid 5 from the tank 1, the gas-phase section inside the tank 1 expands and the temperature of the high-pressure gas 6 in the tank 1 considerably decrease, while the density of the high-pressure gas 6 also decreases. Meanwhile, it takes some time for the pressure decrease in the tank 1 to propagate to the high-pressure gas 6 inside the upper pipe 2a which is in communication with the gas-phase side of the tank 1, and a rapid temperature decrease is less likely to happen due to the influence of heat exchange with ambient air if the upper pipe 2a is exposed to ambient air. Thus, the high-pressure gas 6 in the upper pipe 2a has a higher temperature than the high-pressure gas 6 in the tank 1, that is, a temperature near ambient temperature (e.g. normal temperature).

Thus, one should consider the high-pressure gas 6 inside the upper pipe 2a as having a temperature close to a normal temperature in the liquid level detection device 110' of the comparative example. However, the liquid level detection device 110' calculates the liquid level of the tank 1 on the premise that the high-pressure gas 6 in the upper pipe 2a is at the same temperature (low temperature) as the high-pressure gas 6 in the tank 1.

Thus, while the liquid level should be calculated from the differential pressure detection result ΔP obtained by the differential pressure gauge 2b using the following expression (1), the liquid level detection device 110' of a comparative example uses the following expression (2) to calculate the liquid level from the differential pressure detection result ΔP by the differential pressure gauge 2b, which causes a liquid level detection error due to the temperature difference ($\Delta T = T_1 - T_0$) of the high-pressure gas 6 between inside the tank 1 and inside the upper pipe 2a.

$$\Delta P = P2 - P1 = \rho_L \cdot g \cdot H + \rho_g(T=T_0) \cdot g \cdot h_2 - \rho_g(T=T_1) \cdot g \cdot h_1 \quad \text{(Expression 1)}$$

$$\Delta P = P2 - P1 = \rho_L \cdot g \cdot H + \rho_g(T=T_0) \cdot g \cdot h_2 - \rho_g(T=T_0) \cdot g \cdot h_1 \quad \text{(Expression 2)}$$

Herein, $H_{max}$ is a height difference between the top portion of the tank 1 and the bottom portion of the tank 1, and H is a height difference between the liquid surface of the liquid 5 in the tank 1 and the bottom portion of the tank 1. Further, $h_2$ represents a height difference from the top portion of the tank 1 and the liquid surface of the liquid 5 inside the tank 1, and $h_1$ represents a height difference from the installment position of the pipe header 8, which is the top portion of the upper pipe 2a, and the installment position of the differential pressure gauge 2b, which is the bottom portion of the upper pipe 2a. Furthermore, $\rho_g$, $\rho_g$ and $\rho_L$ are densities of the high-pressure gas 6, the gas pressure generated by accumulation of the high-pressure gas 6, and the density of the liquid 5. $T_0$ and $T_1$ are the temperature of the high-pressure gas 6 in the tank 1 and the temperature of the high-pressure gas 6 in the upper pipe 2a, respectively (see FIG. 4). In the above expressions (1) and (2), the first term on the right side is the head pressure of the liquid 5 in the tank 1, the second term is the head pressure of the high-pressure gas 6 in the tank 1, and the third term is the head pressure of the high-pressure gas 6 in the upper pipe 2a.

In contrast, the liquid level detection, device 110 according to the present embodiment is filled with the filling liquid 9 in at least a partial range inside the upper pipe 2a as described above, and thus it is possible to reduce liquid level detection errors due to the temperature difference (($\Delta T = T_1 - T_0$)) of the high-pressure gas 6 between inside the tank 1 and inside the upper pipe 2a.

In the case of the liquid level detection device 110, the differential pressure detection result ΔP of the differential pressure gauge 2b is represented by the following expression (3).

$$\Delta P = P2 - 1 = \rho_L \cdot g \cdot H + \rho_g(T=T_0) \cdot g \cdot h_2 - \rho_g(T=T_1) \cdot g \cdot h_{1B} - \rho_1 \cdot g \cdot h_{1A} \quad \text{(Expression 3)}$$

Herein, $h_{1A}$ is the liquid level of the filling, liquid 9 filling the upper pipe 2a, inside the upper pipe 2a, and $h_{1A}$ is a height difference between the bottom portion of the upper pipe 2a (installment position of the differential pressure gauge 2b) and the liquid level of the filling liquid 9. The parameter $\rho_1$ is the density of the filling liquid 9. Other parameters are the same as those in FIG. 4 (see FIG. 5). In the above expression (3), the first term of the right side is the head pressure of the liquid 5 in the tank 1, the second term is the head pressure of the high-pressure gas 6 in the tank 1, and the third term is the head pressure of the high-pressure gas 6 in the upper pipe 2a, and the fourth term is the head pressure of the filling liquid 9 in the upper pipe 2a.

Accordingly, in the liquid level detection device 110 according to the present embodiment, the high-pressure gas 6 is replaced with the filling liquid 9 inside the upper pipe 2a. Thus, the third term on the right side of the above expression (1) is replaced with the sum of the third and fourth terms on the right side in the above expression (3).

Herein, unlike a gas (high-pressure gas 5), the density $\rho_1$ of a liquid (filling liquid 9) is substantially constant with respect to a temperature change. Thus, the head pressure of the filling liquid of the fourth term on the right side of the expression (3) is substantially constant regardless of the temperature.

Thus, in the expression (3), for the presence of the fourth term on the right side, a proportion of the head pressure of the high-pressure gas 6, whose density is greatly affected by temperature, to the head pressure of the entire fluid inside the upper pipe 2a decreases. Accordingly, it is possible to reduce liquid level detection errors due to a temperature difference ($\Delta T = T_1 - T_0$) of the high-pressure gas 6 between inside the tank 1 and inside the upper pipe 2a.

As described above, in the configuration shown in EEGs, 1 and 5, the inside of the upper pipe 2a in communication with the gas-phase section inside the tank 1 is filled with the filling liquid 9 in at least a partial range, and the density of the filling liquid 9 changes in response to a temperature change so slightly that can be ignored, as compared to the high-pressure gas 6. Thus, in the configuration shown in FIGS. 1 and 5, with the filling liquid 9 filling a part of the upper pipe 23 and the head pressure of the filling liquid 9 occupying a part of the head pressure inside the upper pipe 2a, it is possible to reduce liquid level detection errors due to the temperature difference of the high-pressure gas between inside the tank 1 and inside the upper pipe 2a.

That is, in the liquid supplying apparatus 100' shown in FIG. 2, due to the difficulty of accurately measuring the meat temperature difference described above, liquid level detection errors are generated when calculating the liquid level of the liquid 5 in the tank 1 from the differential pressure ΔP detected by the differential pressure gauge 2h. However, due to the above reason, the liquid supplying apparatus 100 and the liquid level detection device 110 shown in FIGS. 1A and 1B according to some embodiments of the present invention have a technical advantage of reducing liquid-level detection errors in calculation of the liquid level of the liquid 5 inside the tank 1 and accurately detecting the liquid level of the liquid 5 as much as possible, even if there is a great temperature difference as described above.

Further, according to an illustrative embodiment of the present invention, in the configuration shown in FIGS. 1 and 5, the liquid level of the filling liquid 9 filling the inside of the upper pipe 2a may be set within minus 50 cm from the height at which the pipe header 8 is positioned.

According to this embodiment, the liquid level of the filling liquid 9 filling the inside of the upper pipe 2a is set to be within minus 50 cm from the height of the pipe header 8 through which the upper pipe 2a is in communication with the gas-phase section, of the tank 1. As a result, most part of the upper pipe 2a is filled with the filling liquid 9, and thus most part of the head pressure in the upper pipe 2a is occupied, by the head pressure of the filling liquid 9. Accordingly, it is possible to reduce liquid level detection errors due to a temperature difference of the high-pressure gas 6 between inside the tank 1 and inside the upper pipe 2a, effectively.

DESCRIPTION OF REFERENCE NUMERALS

1 Tank
2 Differential pressure pipe.
2a Upper pipe
2b Differential pressure gauge
2c Lower pipe
3 Valve
4 Discharge pipe
5 Liquid
6 High-pressure gas
7 Temperature sensor
8 Pipe header
9 Filling liquid
10 Liquid level calculation part
11 Flow rate calculation part
21, 22, 23 Pressure component
100, 100' Liquid supplying apparatus
110 Liquid detection device
ΔP Differential pressure
P1, P2 Pressure
T Temperature

The invention claimed is:

1. A liquid level detection device of a liquid supplying facility which comprises: a tank, in which a liquid is stored and a high-pressure gas is enclosed; a discharge pipe for discharging the liquid in the tank to outside with the high-pressure gas; and a valve, disposed in the discharge pipe, for switching a communication state between the tank and the outside, the liquid level detection device comprising:
a lower pipe which is in communication with a liquid-phase section of an interior space of the tank, the liquid-phase section being occupied by the liquid;
an upper pipe which is in communication with a gas-phase section of the interior space of the tank, the gas-phase section being disposed above the liquid-phase section and occupied by the high-pressure gas;
a differential pressure gauge for detecting a differential pressure between the lower pipe and the upper pipe; and
a liquid level calculation part for calculating a liquid level of the tank on the basis of a differential pressure detection result of the differential pressure gauge,
wherein an inside of the upper pipe is filled with a filling liquid at least in a partial range.

2. The liquid level detection device for a liquid supplying facility according to claim 1, further comprising a flow rate calculation part for obtaining a flow rate of the liquid flowing through the discharge pipe of the liquid supplying facility, on the basis of a temporal change of the liquid level of the tank detected by the liquid level calculation part.

3. The liquid level detection device for a liquid supplying facility according to claim 1,
wherein an end of the upper pipe is in communication with a gas-phase section of the tank via a pipe header, and
wherein a liquid level of the filling liquid filling an inside of the upper pipe is within minus 50 cm from a height at which the pipe header is positioned.

4. The liquid level detection device for a liquid supplying facility according to claim 1,
further comprising a temperature sensor for detecting a temperature of the high-pressure gas in the tank,
wherein the liquid level calculation part is configured to calculate the liquid level of the tank on the basis of a temperature detection result obtained by the temperature sensor, in addition to the differential pressure detection result.

5. The liquid level detection device for a liquid supplying facility according to claim 1,
wherein the high-pressure gas contains nitrogen gas.

6. A liquid supplying facility, comprising:
a tank in which a liquid is stored and a high-pressure gas is enclosed;
a discharge pipe for discharging the liquid in the tank to outside with the high-pressure gas; and
a valve, disposed in the discharge pipe, for switching a communication state between the tank and the outside; and
the liquid level detection device according to claim 1, configured to detect a liquid level of the tank.

7. A liquid level detection method of a liquid supplying facility which comprises: a tank in which a liquid is stored and a high-pressure gas is enclosed; a discharge pipe for discharging the liquid in the tank to outside with the high-pressure gas; and a valve, disposed in the discharge pipe, for switching a communication state between the tank and the outside, the liquid level detection method comprising:
a step of detecting a differential pressure between: a lower pipe which is in communication with a liquid-phase section of an interior space of the tank, the liquid-phase section being occupied by the liquid; and an upper pipe which is in communication with a gas-phase section of the interior space of the tank, the gas-phase section being disposed above the liquid-phase section and occupied by the high-pressure gas; and
a step of calculating a liquid level of the tank on the basis of a detection result of the differential pressure,
wherein an inside of the upper pipe is filled with a filling liquid at least in a partial range.

* * * * *